Oct. 27, 1964    F. W. GREER, JR    3,154,137
AUTOMATIC TEMPER CONTROLLING APPARATUS
Filed Oct. 17, 1962    4 Sheets-Sheet 1

Oct. 27, 1964    F. W. GREER, JR    3,154,137
AUTOMATIC TEMPER CONTROLLING APPARATUS
Filed Oct. 17, 1962    4 Sheets-Sheet 2

Oct. 27, 1964  F. W. GREER, JR  3,154,137
AUTOMATIC TEMPER CONTROLLING APPARATUS
Filed Oct. 17, 1962  4 Sheets-Sheet 4

United States Patent Office 3,154,137
Patented Oct. 27, 1964

3,154,137
AUTOMATIC TEMPER CONTROLLING
APPARATUS
Frederick W. Greer, Jr., Lynnfield, Mass., assignor to
J. W. Greer Company, Wilmington, Mass., a corporation of Massachusetts
Filed Oct. 17, 1962, Ser. No. 231,077
10 Claims. (Cl. 165—12)

This invention relates to conditioning of chocolate and other similar fat-containing substances and more particularly to apparatus for controlling the temper of such substances prior to the molding, dipping, spreading, coating or other similar operations.

In order to obtain the desired characteristics of chocolate as applied in a confection it is necessary to properly condition or temper the chocolate. The fat portion of chocolate has a variety of different crystalline forms in which there is increasing stability as the crystal melting point temperature increases. In a typical tempering process the chocolate is initially heated up to about 110° F. to melt the meltable portion of the chocolate. Then the chocolate is cooled to about 80° F. to create a condition suitable for forming "seeds" which affect the subsequent solidification rate and the quality of the solidified chocolate. The chocolate is then reheated to a coating temperature (in the order of 88 to 91° F.) in a careful manner and maintained at that temperature for application to the coating apparatus. The chocolate in that condition is pumped from a storage tank through a "curtain" in the coating operation and returned to the storage tank. The tank in which the chocolate is held is typically maintained at a thermostatically controlled temperature as by water jackets. In the prior systems a skilled operator judges the characteristics of the chocolate for proper temper by means of its viscosity, color, sheen, and the operator's experience and adjusts the temperatures accordingly. The particular characteristics which such operators consider necessary are not susceptible to easy definition. Further, where an environmental condition changes, as, for example due to an increased rate of coating usage, the chocolate tends to lose its temper due to the addition of untempered make up chocolate and compensation must be promptly made for these changed conditions in order to maintain the quality of the chocolate temper. In addition, there is wide variation in different types of chocolate. For example, bitter-sweet chocolate releases substantially more heat of crystallization as it is cooled than does milk chocolate and furthermore different operating temperatures are usually required. In order to realize the full potential of cooling tunnels it is necessary to control the temper of chocolate in a coater apparatus within narrow limits.

It is an object of this invention to provide novel and improved apparatus for exercising general supervisory control over production apparatus for processing fat containing substances such as chocolate.

Another object of the invention is to provide an improved apparatus for controlling the tempering of fat containing substances in an automatic and continuous manner.

A further object of the invention is to provide novel and improved apparatus for sampling a fat containing substance and adjusting the conditions of storage thereof for controlling its temper.

In accordance with the invention overall control of the temper of a fat containing substance employed in a processing operation is provided throughout the production day. First control means is provided for restoring the temper of the substance from its standby condition and second control means, operative in response to the first control means, that exercises continuous supervision on the actual temper of the substance and adjusts the system to maintain the desired degree of temper.

In the preferred embodiment of the invention, this second control means periodically subjects a sample portion of chocolate flowing to coating apparatus to a cooling influence. The temperature of that portion of the chocolate is continuously sensed and when it reaches a predetermined temperature a timing device is actuated for a pre-established interval. At the end of that interval a servomechanism is operated in response to any sensed deviation from the ideal temperature to adjust the temperature of the stored chocolate to improve the temper condition of the chocolate.

Apparatus constructed in accordance with principles of the invention provides an automatically obtained and uniformly secured sample in which a temperature sensing element is positioned without subjecting the sample to variable heat transfer conditions, and the sample is immersed in a controlled temperature environment. The invention provides apparatus for automatically controlling temper of chocolate and other fat containing substances prior to a dipping, coating, spreading or depositing operation and which may be done in an automatic manner and does not require experienced artisans responding in subjective manners to provide properly tempered chocolate.

Other objects, features and advantages of the invention will be seen as the following description of a preferred embodiment progresses, in conjunction with the drawings, in which.

Figure 1:
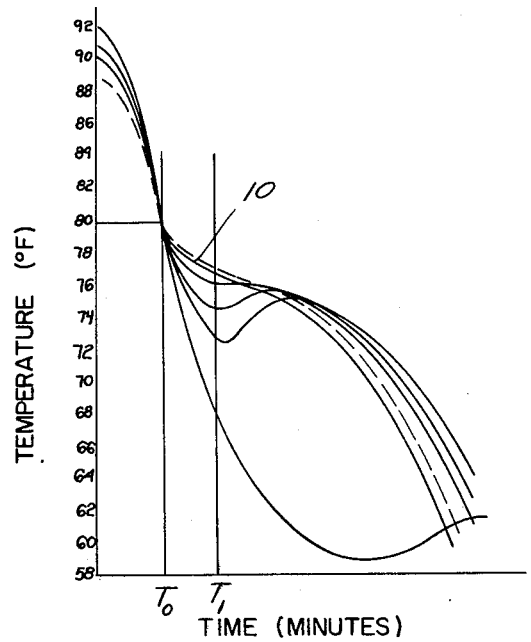
FIG. 1 is a graphical illustration of a set of typical chocolate cooling curves.

The graph shown in FIG. 1, in which temperature is plotted against time, illustrates cooling characteristics for chocolate of various tempers. Each curve starts within a relatively narrow temperature range (88 to 92° F.) but the curves vary widely as the chocolate cools as a function of the temper of the chocolate because of the release of heats of crystallization. It will be noted, however, that the curves are drawn so that all pass through substantially the same point at time $T_0$ (about 80° F. for this illustrative chocolate) although the actual time from start to $T_0$ may vary. Well tempered chocolate follows a curve such as 10 whereas curves of less well tempered chocolate will lie below the well tempered curve and actually have points of inflection as the temper becomes worse. It will also be noted that there is wide variation in the temperature of the chocolate at time $T_1$ after time $T_0$. In accordance with principles of the invention, apparatus is provided which automatically takes a sample of chocolate as being applied to the coater or other utilization device and subjects it to a controlled cooling operation. At a particular temperature point sensed by the apparatus (which is variable but in the illustration of FIG. 1 is set at 80°) a timer is started and at the end of the timing interval $T_1$ (which is also variable) the temperature of the chocolate sample is sensed. The actual temperature is compared to an ideal temperature of well tempered chocolate and the storage tank temperature is adjusted accordingly. If the temperature at time $T_1$ is above the ideal temperature the tank is heated and if the actual temperature is below the ideal temperature the tank temperature is automatically reduced. The apparatus regularly samples the chocolate and adjusts the chocolate tank temperature in an automatic manner to correct the tank temperature to maintain a chocolate of properly tempered condition.

Figure 2:
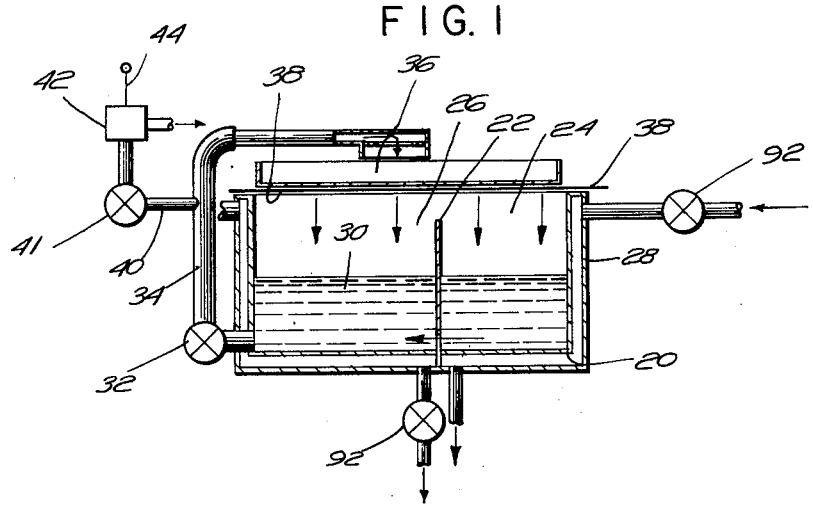
FIG. 2 is a diagrammatic view of a chocolate temper tank and temper controlling apparatus constructed generally in accordance with the principles of the invention.

The apparatus of the invention is shown in diagrammatic form in FIG. 2. A supply of chocolate is stored in tank 20 which may be separated by divider 22 into a hot tank section 24 and a tempered tank section 26. Suitable means is provided for controlling the temperature of the tank sections as by the water jacket wall 28 through which water at the desired temperature is circulated to control the temperature of the chocolate 30 in the tank and create the desired temper characteristics. An output in the tank, connected to pump 32 and riser 34, enables the tempered chocolate to be fed to a coating mechanism 36 through which the chocolate passes and falls in a "curtain." The articles to be coated pass on an open mesh conveyor 38 through this "curtain." The unused chocolate falls through conveyor 38 and is returned to the hot and temper tanks 24, 26. In a typical installation the hot tank 24 is maintained at a temperature a few degrees warmer than the temper tank 26 and separate water recirculation paths are utilized, although this divided tank is not essential to the invention.

Associated with the riser 34 is a sampling device which includes a bypass conduit 40 and pump 41 connected to a sampling chamber 42 in which a temperature sensor 44 is mounted.

Figure 3:
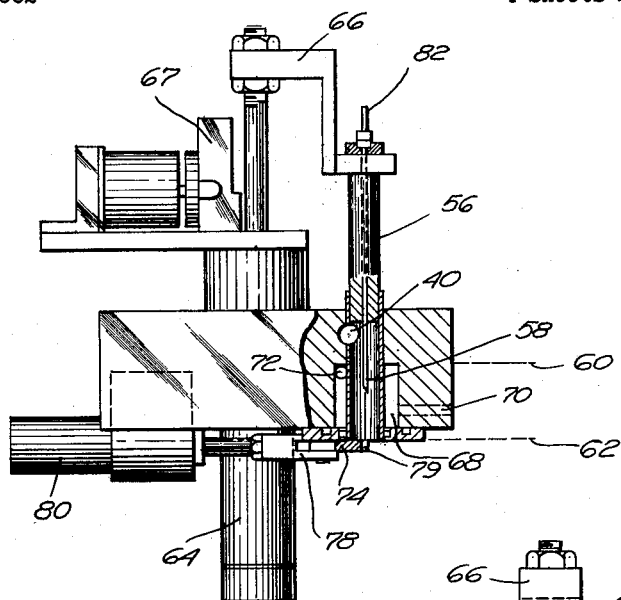
FIGS. 3–5 are views of the sampler employed in the chocolate temper controlling apparatus constructed in accordance with principles of the invention.
Figure 4:
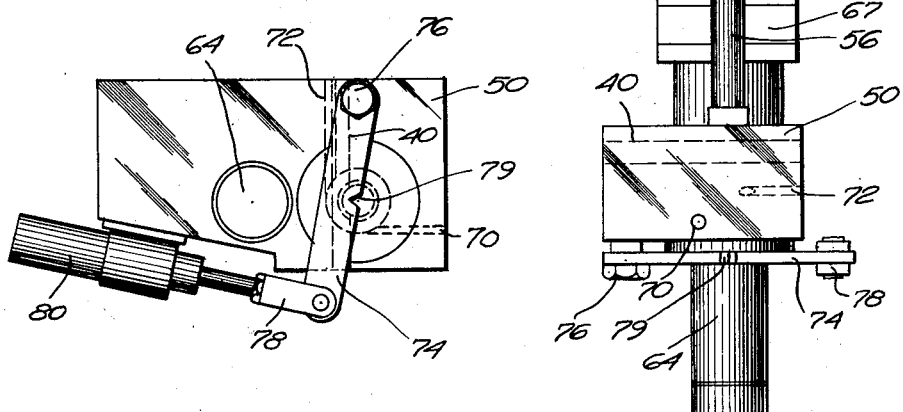
Figure 5:
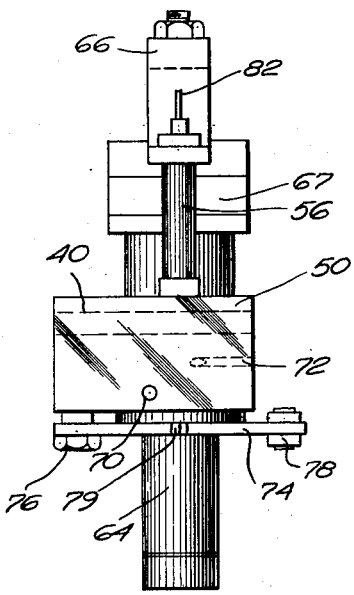

This sampling device is shown in FIGS. 3–5. Chocolate is pumped from the riser 34 and passes through channel 40 in block 50. Formed within the sampling unit block 50 is a cylindrical chamber 54 that extends perpendicularly to the chocolate flow in channel 40 and partially intercepts that channel. Piston 56 is mounted for reciprocating movement in chamber 54 and a temperature sensor in the form of a thermistor 58 is fixed in position coaxial with piston 56 in the center of the lower portion of the chamber 54 as best indicated in FIG. 3. The piston 56 is reciprocated between a raised position as shown in FIG. 3, an intermediate position indicated by dotted line 60 and a lower position indicated by dotted line 62, by air actuated cylinder 64, cooperating with air actuated stop 67 and linkage 66. Thermistor 58 remains stationary at all times. At the lower end of the chamber 54 there is a water jacket area 68 to which a cooling or heating fluid is admitted as desired entering through inlet conduit 70 and exiting through conduit 72. The bottom of the cylinder is closed by lever arm 74 secured to the cylinder block 50 by means of bolt 76 for pivoting movement in a plane perpendicular to the axis of cylinder 54. The other end of the lever is pinned to a clevis 78 and actuating cylinder 80 so that arm 74 may be moved across the cylinder 54 to close the lower end thereof except for a small V-notch 79 in arm 74. With the piston 56 in its upper position as shown in FIG. 3, chocolate is free to flow through channel 40 and also into chamber 54. When a sample is to be measured, the chamber is closed by lowering piston 56 to position 60, thus preventing additional chocolate from entering the chamber without completely closing the flow path through the channel 40. At that time cooling water, of 53° F. temperature for example, is introduced through conduit 70 to the water jacket chamber 68 to subject the quantity of chocolate in the cylinder cavity to a constant temperature cooling influence. As the chocolate is cooled the thermistor 58 senses the change in temperature and provides a signal indicative of the temperature of the sample over line 82 to associated control circuitry. At the end of the sensing period heated water is introduced to the water jacket 68 to free the solidified chocolate sample from the cylinder cavity walls. Actuator 80 then moves lever arm 74 out from in front of chamber 54 and piston 56 is driven down by actuator 64 to eject the sample. Piston 56 is then raised in anticipation of another sampling operation and lever arm 74 is moved back to the position shown in FIG. 3.

Figure 6:
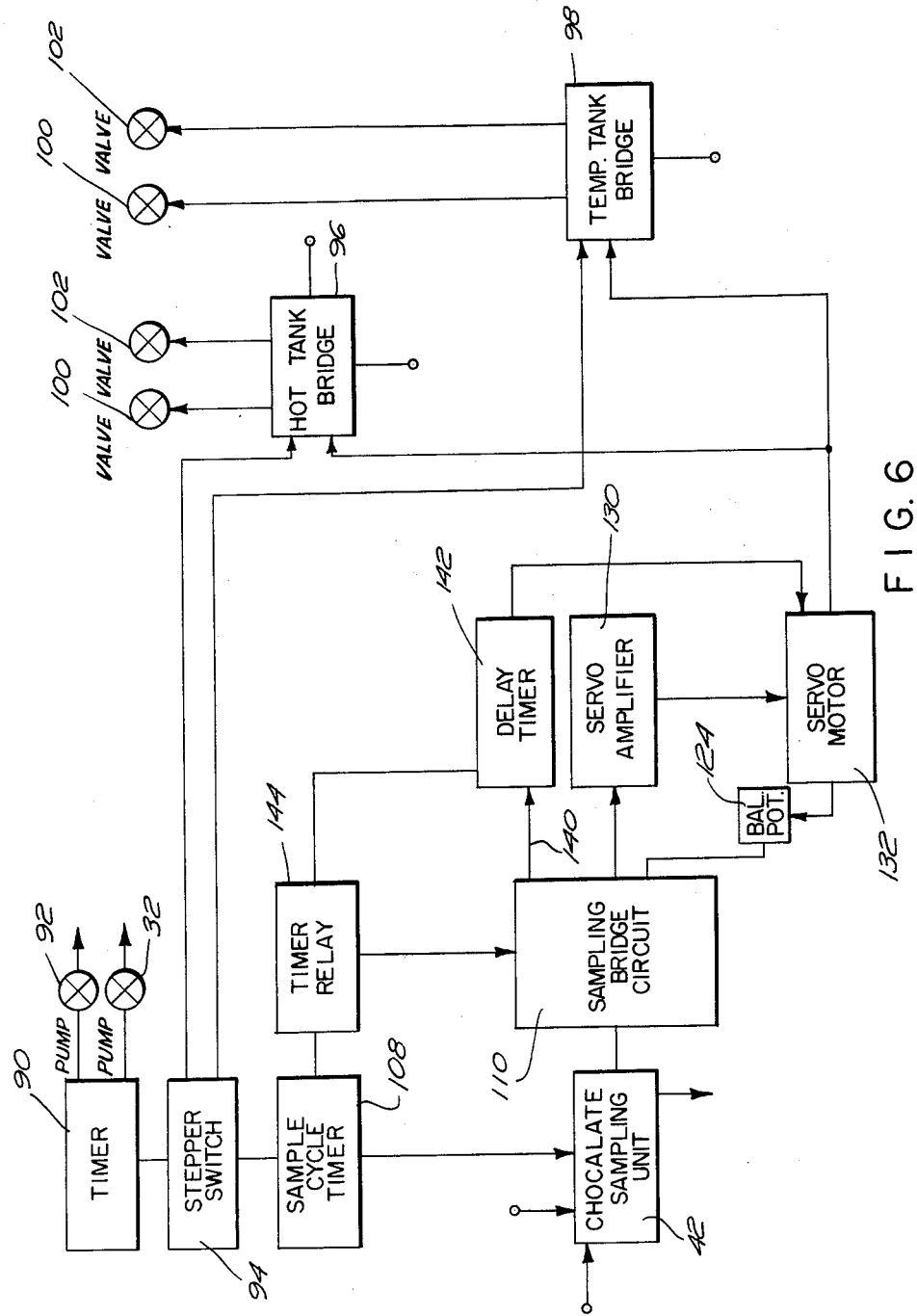
FIG. 6 is a block diagram of chocolate temper controlling apparatus constructed in accordance with principles of the invention.

A block diagram of the control apparatus employed for automatic temper control of a chocolate coating system is shown in FIG. 6. This system controls an entire twenty-four-hour sequence. A main timer 90 is employed and driven in conventional manner by a suitable source of power. Initially the system prepares to circulate the chocolate which has been temperature controlled in standby condition. This control first starts pump 92 which circulates fluid through the riser and tank jackets. About fifteen minutes later a second circuit energizes the chocolate pump 32 to circulate the chocolate and also actuates mixing and scraping devices (not shown) within the tanks. After about twenty minutes a third circuit closes to energize the stepper switch mechanism 94.

The stepper switch mechanism controls the jacket water temperature through bridges 96, 98 which operate temperature controller valves 100, 102 to control the flow of hot and cold water to the tank jackets. As the chocolate in the tanks has been held in standby condition at a temperature above the desired temperature, the tank temperature is initially reduced. In the first step switch position the jacketed tank temperature control bridge circuits 96 and 98 automatically are set to balance at a water temperature of about 70° F. The tank temperature sensing bridges are set such that when the chocolate temperature reaches 80° F. (for example) the stepping switch 94 will index to a second position. In that position bridge circuits 96 and 98 call for a water temperature of 80° which is held for approximately fifteen minutes by a timer. At the end of this time period the timer causes the stepping switch 94 to index to a third position where bridge circuits 96 and 98 call for 92° F. water in the jackets. When the chocolate reaches a preset temperature as sensed by the bridge thermistors (for example, 89°) the stepping switch 94 is again energized and indexes to a fourth position energizing the sample cycle timer 108 and the temper controlling circuitry. The particular temperatures and times involved for the above sequence will vary depending upon the type of chocolate.

The sample cycle timer of this embodiment cycles completely every four to five minutes and during that period it controls the sampling mechanism 42 to obtain a chocolate sample; to circulate cooled water about the sample; to transmit a temperature to a sampler bridge circuit 110 and then discharge the sample at the end of the sampling period and prepare the sampling unit for the next cycle.

Figure 7:
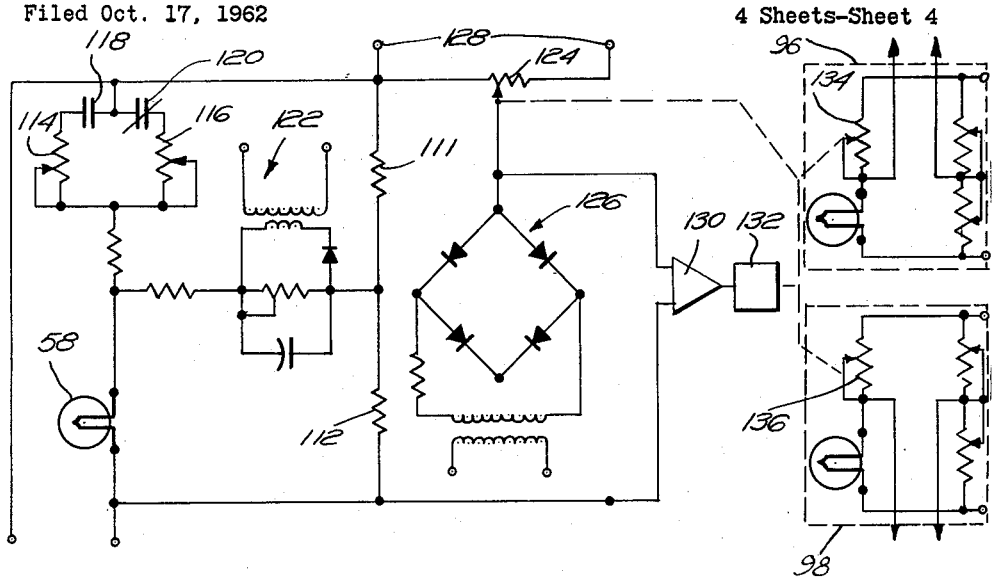
FIG. 7 is a schematic diagram of the electrical circuitry employed in the temper controlling apparatus.

A schematic diagram of the sampler bridge circuit and control associated therewith is shown in FIG. 7. The thermistor 58 in the sampling device is connected in one leg of the bridge circuit. Two identical resistors 111, 112 are connected to form two other legs of the bridge circuit and the fourth leg of the bridge circuit includes two variable resistances 114, 116, resistance 114 being connected in circuit by normally open contact 118 and resistance 116 being connected in circuit by normally closed contact 120 operated by the same relay. A D.C. signal is supplied to the bridge through a rectifier network from the A.C. source 122. An output of the bridge circuit is taken through a servo potentiometer 124 for application to a servo amplifier. A bridge rectifier 126 supplies a signal to operate the servo amplifier. A D.C. voltage connected at terminals 128 is applied across the servo potentiometer 124. The servo amplifier 130 drives a servo motor 132 to adjust hot tank controlling potentiometer 134 and temper tank controlling potentiometer 136. Each potentiometer feeds a respective signal into the controlling bridge 96, 98 to provide an adjustment of the temperature control fluid in accordance with the signal provided by the servo motor and its adjustment of the controlling potentiometers.

Figure 8:
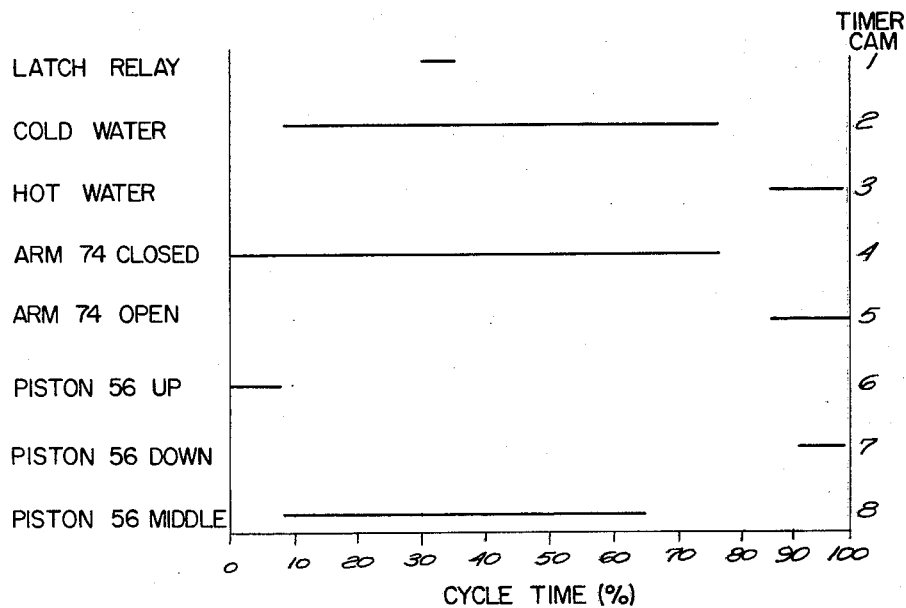
FIG. 8 is a timing diagram indicating a timing cycle for the operation of the sampling mechanism.

A timing diagram of the operation of the sample cycle timer 108 is shown in FIG. 8. The timer has eight cams as indicated. With chocolate flowing through channel 40, cylinder 80 is energized to move arm 74 to close the gate having a small opening and the actuator 64 is energized to raise piston 56 so that the passageway between channel 40 and chamber 54 is open. Cylinder 64 is next actuated to move piston 56 down to level 60 to trap a sample in the chamber and at the same time cold water is admitted to water jacket 68. At a predetermined time later (30% of cycle) a latching relay is energized to eliminate further control of water temperature in the jacketed tanks for a timed interval and to energize the field of the servo motor 132. The output of the bridge causes the servo motor to drive servo potentiometer 124 to a first mechanical stop at one end of the potentiometer. As the chocolate cools down (with reference to FIG. 1) the bridge 110 comes into balance at 80° F. (the preset temperature indicated by $T_0$ on the curve of FIG. 1) and at that point the output circuit of the bridge produces a signal on line 140 (FIG. 6) which starts the timer 142. The chocolate continues to cool and during the timed interval the energized servo motor 132 rotates the servo potentiometer 124 in the opposite direction to a reference position against a second mechanical stop at the opposite end of the potentiometer. At the end of the preset time ($T_1$) the relay 144 of timer 142 is energized to open contact 120 and close contact 118 and the "ideal temper" arm (resistance 114) is substituted in the bridge circuit. The water temperature bridges 96 and 98 are re-energized at this time also. The bridge circuit 110 quickly comes into balance through the bridge output being fed to the servo amplifier 130 and re-adjustment of the servo potentiometer 124 by the servo motor 132 and then the servo motor field is de-energized. If the temper is better than the "ideal" the servo potentiometer 124 (tied in mechanically with the hot and tempered tank potentiometers 134, 136) will be in a position calling for warmer tank temperatures (the maximum temperature being limited to about 93° F.). Conversely, if the temper is not as good as the "ideal" the potentiometer will be in a position calling for colder tanks thus creating an environment conducive to the faster build-up of "seed" and temper.

After the temper sensing operation cam 2 de-energizes the cold water circuit and cam 3 operates to apply hot water to the water jacket 68 surrounding the chocolate sample to free the sample from the walls of chamber 54. At the same time cam 5 energizes cylinder 80 to operate lever 74 and open the chamber 54. Finally, piston 56 in response to cam 7 is moved down to eject the sample. At the cycle the mechanism is reset to initiate the next sampling operation.

This sampling cycle is continuously and automatically repeated throughout the production day and maintains the temper of the chocolate. At the end of the production day the timer 90 steps switch 94 to apply signals to the valves 100, 102 to warm up the tanks (to a temperature in the order of 110° F.) and untemper the chocolate before shutdown of the coater. The chocolate is then automatically maintained in standby condition until the start of the next production day as described above. Thus the invention provides overall control of a manufacturing operation involving the processing of fat containing substances such as chocolate while automatically maintaining the desired temper characteristics of the substance throughout the production day.

While a preferred embodiment of the invention has been shown and described, various modifications thereof will be apparent to those skilled in the art and therefore it is not intended that the invention be limited to the described embodiment or to details thereof and departures may be made therefrom within the spirit and scope of the invention as defined in the claims.

I claim:

1. Apparatus for automatically conditioning a fat-containing substance comprising a storage vessel adapted to hold said substance,
    means for adjusting the temperature of said storage vessel,
    timing means,
    first control means responsive to said timing means to operate said temperature adjusting means to cycle said storage vessel from a standby condition to a predetermined operating temperature to condition the substance held in said storage vessel,
    and second control means operative in response to said first control means after said storage vessel has reached said predetermined operating temperature to repetitively subject samples of the substance held in said storage vessel to a predetermined time-temperature cycle, including
    means to sense a characteristic of each said sample during the time it is subjected to said predetermined cycle and means to operate said storage vessel temperature adjusting means in response to the value of the sensed characteristic of each said sample to maintain a desired condition of the substance stored in said vessel.

2. The apparatus as claimed in claim 1 wherein said apparatus includes a sampling chamber,
    a substance circulating conduit connected to said storage vessel and at least partially intercepting said sampling chamber,
    and wherein said second control means includes means to periodically transfer a sample of said substance from said circulating conduit to said chamber,
    means to subject said sample in said chamber to a predetermined temperature influence,
    means to sense the temperature of said sample after a predetermined time interval and to adjust the temperature of said storage vessel in response to the sensed sample temperature.

3. The apparatus as claimed in claim 2 wherein said temperature sensing means includes a temperature sensing element mounted within said chamber,
    said sensing element having an electric characteristic which changes as a function of temperature,
    and further including a second timing means,
    electrical circuit means to indicate a reference point at a predetermined temperature as sensed by said sensing element to start said second timing means,
    and means operative in response to said second timing means to compare the actual temperature of the sample with an ideal temperature and to adjust the storage vessel temperature as a function thereof to maintain the stored substance in properly tempered condition.

4. Apparatus for automatically conditioning a chocolate substance comprising a storage vessel adapted to hold said substance,
    means for adjusting the temperature of said storage vessel,
    timing means,
    first control means responsive to said timing means to operate said temperature adjusting means to initially cool said storage vessel from a standby condition and then to warm said storage vessel to a predetermined operating temperature to condition the substance held in said storage vessel,
    and second control means operative in response to said first control means after said storage vessel has reached said predetermined operating temperature to repetitively subject samples of the substance held in said storage vessel to a predetermined time-temperature cycle, including
    means to sense a characteristic of each said sample during the time it is subjected to said predetermined cycle and means to operate said storage vessel temperature adjusting means in response to the value of the sensed characteristic of each said sample to maintain a desired condition of the substance stored in said vessel.

5. Apparatus for continuously monitoring a fat-containing substance subject to tempering procedures to control its temper comprising a storage vessel adapted to hold said substance in melted condition,
  a sampling chamber,
  a substance circulating conduit connected to said storage vessel and at least partially intercepting said sampling chamber,
  automatic means to periodically transfer a sample of said substance from said circulating conduit to said chamber,
  means to subject said sample in said chamber to a predetermined cooling influence,
  means to sense the temperature of said sample after a predetermined time interval and to adjust the temperature of said storage vessel in response to the sensed sample temperature,
  and means to eject said sample from said chamber.

6. The apparatus as claimed in claim 5 wherein said temperature sensing means includes a temperature sensing element mounted within said chamber so that the sample in said chamber completely surrounds said sensing element,
  said sensing element having an electric characteristic which changes as a function of temperature,
  and further including a timing means,
  electrical circuit means to indicate a reference point at a predetermined temperature as sensed by said sensing element to start said timing means,
  and means operative in response to said timing means to compare the actual temperature of the sample with an ideal temperature and to adjust the storage vessel temperature as a function thereof to maintain the stored substance in properly tempered condition.

7. Apparatus for continuously monitoring a fat-containing substance subject to tempering procedures to control its temper comprising means to store said substance in melted condition,
  means to periodically subject a sample of the stored substance to a predetermined time-temperature cycle,
  means to sense a dynamic temperature characteristic of the substance in said sample during the period it is subjected to said predetermined cycle and means to adjust the temperature of said storage means as a function of the sensed dynamic temperature characteristic to maintain the substance in said storage means substantially in ideal temper condition.

8. Apparatus for monitoring a supply of fat-containing substance to control its temper comprising storage means for holding a supply of said substance in melted condition,
  means to control the temperature of said storage means,
  means to continuously circulate said substance for application to a utilization device,
  a sampling device disposed in said circulating path,
  said sampling device including a chamber to receive a sample of said substance,
  temperature sensing means disposed within said chamber,
  means to periodically place a sample portion of the circulating substance in said chamber,
  means to apply a cooling fluid to said chamber to cool the sample therein,
  means including said temperature sensor to sense a dynamic temperature characteristic of the sample in said chamber as it cools,
  and means to adjust said storage means temperature control as a function of said sensed dynamic temperature characteristic to maintain the substance in said storage means in substantially ideal temper condition.

9. Apparatus for monitoring a supply of chocolate to control its temper comprising storage means for holding a supply of chocolate in melted condition,
  means to control the temperature of said storage means,
  means to continuously circulate said substance for application to a utilization device,
  a sampling device disposed in said circulating path,
  said sampling device including a chamber to receive a sample of chocolate,
  temperature sensing means disposed within said chamber,
  means to periodically place a sample portion of the circulating chocolate in said chamber,
  means to apply a cooling fluid of fixed temperature to said chamber to cool the chocolate sample held therein,
  control means for determining the temperature of said sample at a fixed time after said sample reaches a pre-established temperature,
  and means responsive to the temperature of said sample at said fixed time to adjust said storage means temperature control to maintain chocolate in said storage means in substantially ideal temper condition.

10. The apparatus as claimed in claim 9 wherein said temperature sensing means includes a temperature sensing element mounted within said chamber so that the sample in said chamber surrounds said sensing means,
  said sensing element having an electric characteristic which changes as a function of the temperature,
  and further including electrical circuit means to indicate a time interval starting point at a predetermined temperature value as sensed by said sensing element,
  and means operative at the end of said fixed time to compare the actual temperature of the sample with an ideal temperature and to adjust the storage vessel temperature as a function thereof to maintain the stored substance in properly tempered condition.

References Cited in the file of this patent
UNITED STATES PATENTS

| 2,348,806 | Gillard et al. | May 16, 1944 |
| 2,787,443 | Meagher et al. | Apr. 2, 1957 |

UNITED STATES PATENT OFFICE
CERTIFICATE OF CORRECTION

Patent No. 3,154,137 October 27, 1964

Frederick W. Greer, Jr.

It is hereby certified that error appears in the above numbered patent requiring correction and that the said Letters Patent should read as corrected below.

Column 8, line 17, for "said substance" read -- chocolate --.

Signed and sealed this 23rd day of March 1965.

(SEAL)
Attest:

ERNEST W. SWIDER
Attesting Officer

EDWARD J. BRENNER
Commissioner of Patents